United States Patent
Gershfeld (10) Patent No.: US 7,065,190 B2
(45) Date of Patent: Jun. 20, 2006

(54) METHOD OF ENCODING AND DECODING COMPUTER VIDEO SIGNALS FOR TRANSMISSION OVER A TWISTED PAIR CABLE

(76) Inventor: Jack Gershfeld, 615 Del Rio Way, Fullerton, CA (US) 92835

( * ) Notice: Subject to any disclaimer, the term of this patent is extended or adjusted under 35 U.S.C. 154(b) by 412 days.

(21) Appl. No.: 10/435,245

(22) Filed: May 12, 2003

(65) Prior Publication Data

US 2004/0228459 A1   Nov. 18, 2004

(51) Int. Cl.
*H04M 11/00* (2006.01)
(52) U.S. Cl. .................... 379/93.01; 379/93.17
(58) Field of Classification Search .......... 379/93.17, 379/93.08, 93.01
See application file for complete search history.

(56) References Cited

U.S. PATENT DOCUMENTS 4,651,232 A * 3/1987 Lemoine et al. .............. 386/13
6,345,323 B1 * 2/2002 Beasley et al. ............... 710/38
6,618,774 B1 * 9/2003 Dickens et al. ............... 710/64

* cited by examiner

*Primary Examiner*—Stella Woo
(74) *Attorney, Agent, or Firm*—Vladimir Khiterer (57) ABSTRACT

A method of encoding and decoding computer video signals for transmission over a twisted pair cable is disclosed. Vertical and horizontal sync components of a video signal are converted into narrow vertical and horizontal sync components having the pulse width of 20 nanoseconds. Narrow vertical and horizontal sync components are then combined with red and green components. After transmission via a twisted pair cable, narrow vertical and horizontal sync components are extracted from red and green components and converted back into vertical and horizontal sync components.

Even though the red and green components also comprise narrow sync signals, the narrow sync signals will not be detected by the detection circuits and presence of such narrow sync components in the red and green components will not interfere with the quality of the picture displayed on the display device.

8 Claims, 7 Drawing Sheets

METHOD OF ENCODING AND DECODING COMPUTER VIDEO SIGNALS FOR TRANSMISSION OVER A TWISTED PAIR CABLE

BACKGROUND OF THE INVENTION

Cables comprising twisted pairs, for example Category 5 cable (CAT5) are widely used to transmit signals between computers and various telecommunications, networking and display devices. CAT5 comprises four unshielded or shielded twisted pairs, each of the twisted pairs comprising two individual conductors (one for running a positive signal and one for an inverted signal). Each individual conductor is twisted together to form one pair of conductors. Four pairs of conductors are bundled together to form twisted pair cable.

The present invention pertains to a method of encoding and decoding computer video signals for transmission over a twisted pair cable. More specifically, this invention allows to transmit five components of an analog video signal generated by a computer (such a s red, green, blue, horizontal sync and vertical sync components) by utilizing only three pairs of conductors. This allows to utilize the unused pair of conductors for transmitting other signals, such as audio or control signals.

Conventionally, transmitting five components of an analog video signal by utilizing only three pairs of conductors is done by first combining horizontal sync and vertical sync components (i.e. generating "composite sync") and then combining composite sync with the green component (or other color component). After the transmission, composite sync is separated from the green component and then horizontal sync is separated from vertical sync.

This method has disadvantages, such as expensive circuitry needed to remove composite sync from the green component and then separate horizontal sync from vertical sync. Further, removing composite sync from the green component is done by clipping, which causes compression and deterioration of the green component. Removing composite sync from the green component can also be done by cutting the sync out, which introduces artifacts into the signal. Leaving sync in the green component will affect most display devices that are not designed to handle sync on green, having the effect of the picture becoming green. Separation of horizontal sync from vertical sync is also problematic due to the artifacts introduced into the horizontal sync signal.

Accordingly, there is a clear need for a method of encoding and decoding computer video signals for transmission of the five components of an analog video signal by utilizing only three pairs of conductors without the disadvantages caused by separation of composite sync from video and separation of horizontal sync from vertical sync.

SUMMARY OF THE INVENTION

The method of the present invention satisfies the above need. Specifically, the present invention is based on the discovery that a narrow sync having the pulse width of 1 to 250 nanoseconds will not be detected by the detection circuits in most display devices, such as monitors and projectors. Therefore, presence of such narrow sync component in any of the color components (red, green or blue) will not interfere with the quality of the picture displayed on the monitor or projector. As such, there is no need to remove either vertical or horizontal sync from any of the color components.

To this end, the vertical sync component which normally has the pulse width of 50 microseconds to 2 milliseconds is converted into a narrow vertical sync component having the pulse width of about 20 nanoseconds. It is then combined with the red component, thereby generating a combined red narrow vertical sync component. The horizontal sync component which normally has the pulse width of 1 to 5 microseconds is converted into a narrow horizontal sync component having the pulse width of about 20 nanoseconds. It is then combined with the green component, thereby generating a combined green narrow horizontal sync component. The narrow sync can have the pulse width ranging from about 1 nanosecond to about 250 nanoseconds, however, the narrower the sync, the less distance it can travel without losing the signal. On the other hand, the wider the sync, the more likely it will be detected by a display device, thus adversely affecting the quality of the video signal.

The combined red color narrow vertical sync, combined green narrow horizontal sync and blue components are then transmitted via the twisted pairs cable such that one pair of conductors is used for transmission of each of the components, thereby utilizing only three pairs of conductors. The narrow vertical sync component is then extracted from the red component and converted back into the vertical sync component having the normal pulse width of 50 microseconds to 2 milliseconds. The narrow horizontal sync component is extracted from the green component and converted back into the horizontal sync component having the normal pulse width of 1 to 5 microseconds.

The computer video signal comprising combined red narrow vertical sync, combined green narrow horizontal sync, blue, vertical sync and horizontal sync components is then received at the display device. Even though the red and green components also comprise narrow sync signals, the narrow sync signals will not be detected by the detection circuits and presence of such narrow sync components in the red and green components will not interfere with the quality of the picture displayed on the display device.

DETAILED DESCRIPTION OF THE PREFERRED EMBODIMENTS

This invention will be better understood with the reference to the drawing figures FIG. 1 through FIG. 7. The same numerals and/or letters refer to the same elements in all drawing figures.

Figure 1:
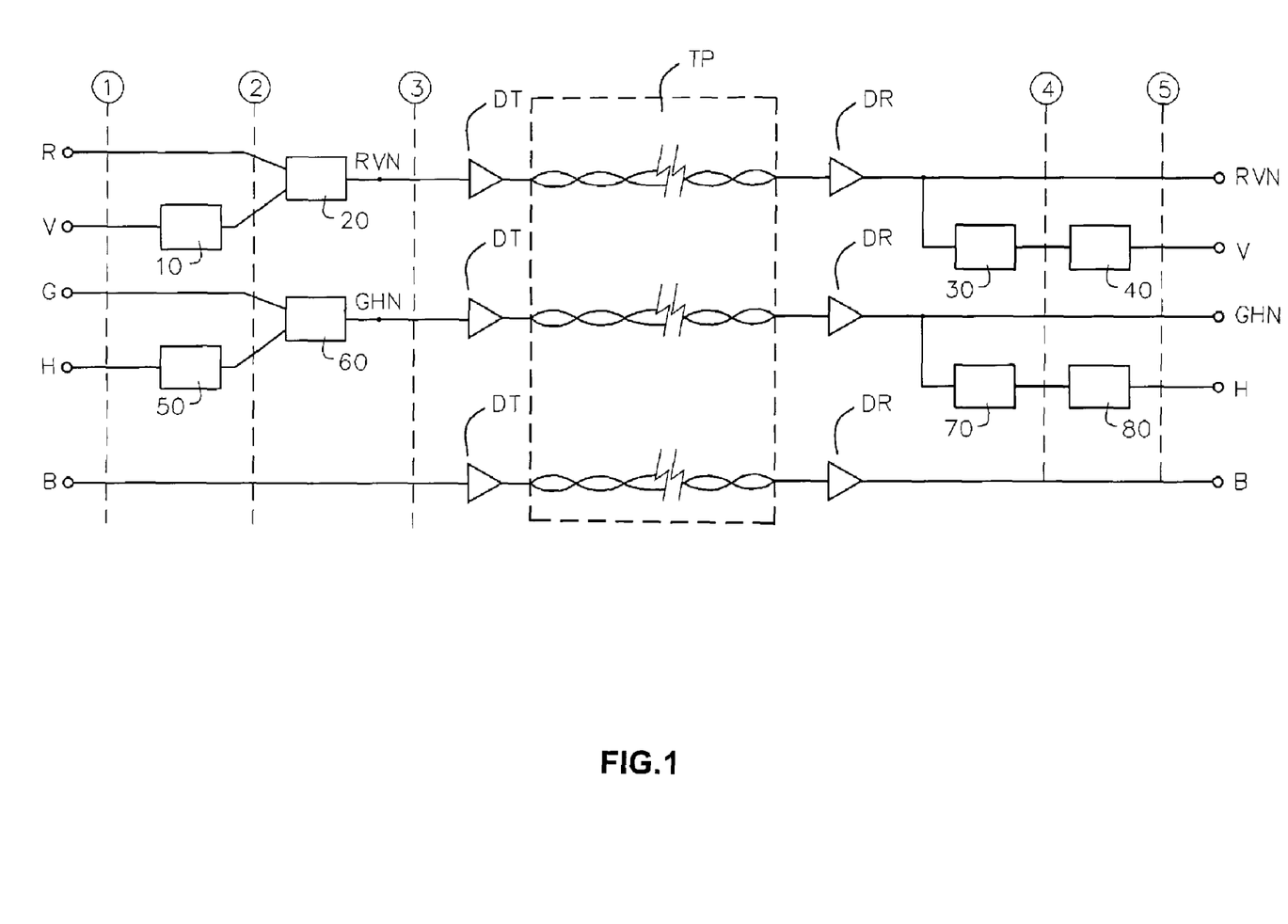
FIG. 1 shows a schematic representation of the method of encoding and decoding computer video signals for transmission over a twisted pair cable according to the preferred embodiment of the present invention.
Figure 2:
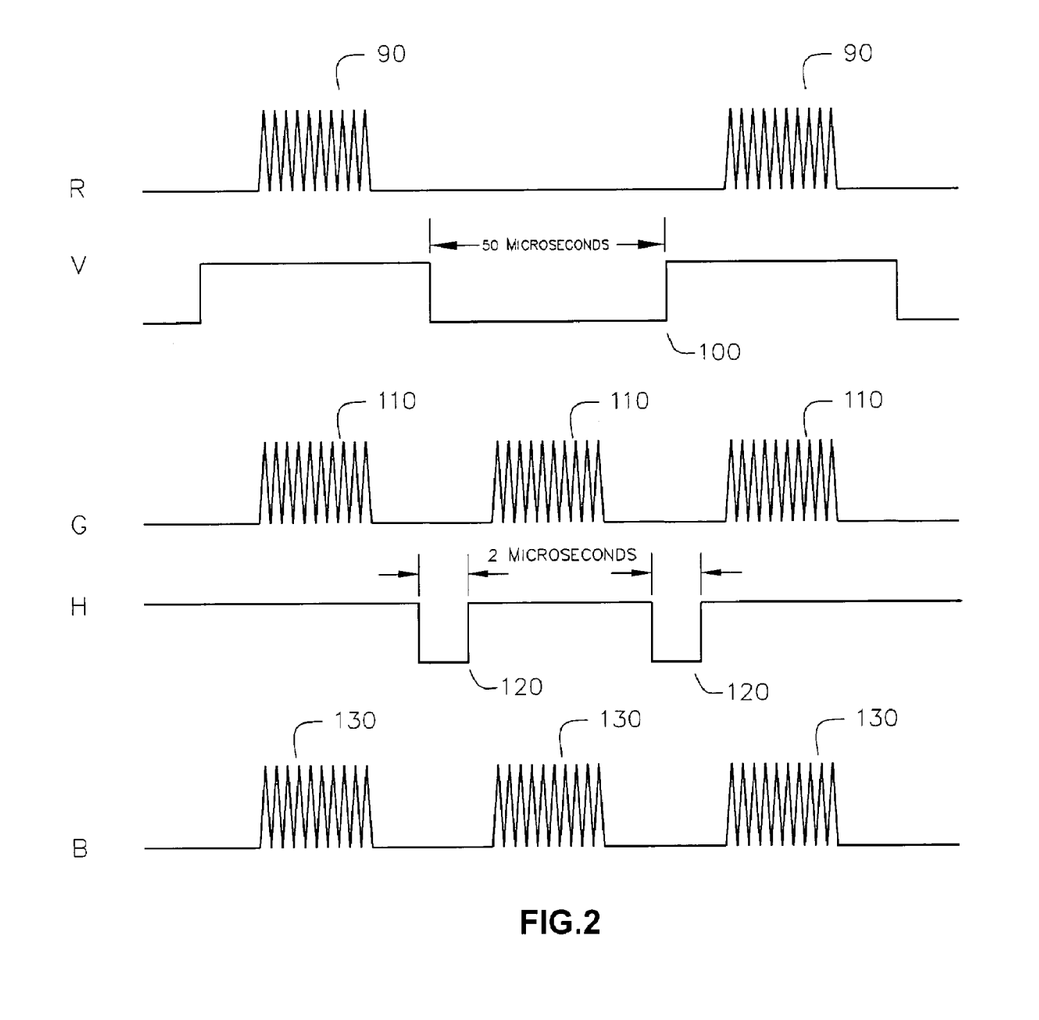
FIG. 2 shows graphs of the components of the computer video signal at juncture 1 of FIG. 1.

Viewing FIG. 1, letters R, G, B, V and H indicate, respectively, red color, green color, blue color, vertical sync and horizontal sync components a computer video signal applied to a twisted pairs cable. Viewing now FIG. 2, numeral 90 indicates the graph of red color component R at junction 1 shown at the vertical frame rate; numeral 100 indicates the graph of vertical sync component V at junction 1 shown at the horizontal line rate; numeral 110 indicates the graph of green color component G at junction 1, which is shown as having the pulse width of 50 microseconds; numeral 120 indicates the graph of horizontal sync component H at junction 1, which is shown as having the pulse width of 2 microseconds; numeral 130 indicates the graph of blue color component B at junction 1 shown at the horizontal line rate (as well as junctions 2, 3, 4 and 5).

Figure 3:
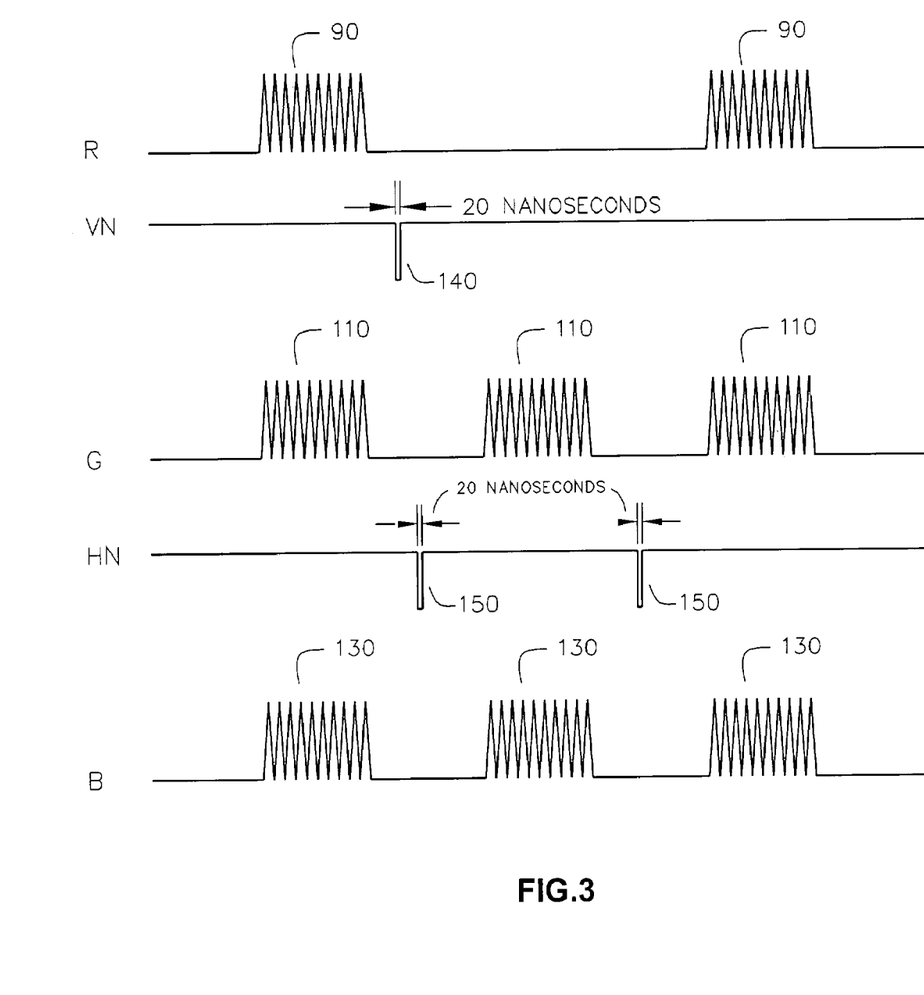
FIG. 3 shows graphs of the components of the computer video signal at juncture 2 of FIG. 1.

Viewing again FIG. 1, numeral 10 indicates a first sync converting means. Vertical sync component V is passed through first sync converting means 10 and becomes converted into a narrow vertical sync component. Viewing now FIG. 3, letters VN indicate the narrow vertical sync component. Numeral 140 indicates the graph of narrow vertical sync component VN, which is shown in FIG. 3 as having the pulse width of 20 nanoseconds. However, narrow vertical sync component VN can have a pulse width ranging from about 1 nanosecond to about 250 nanoseconds. The upper range of the pulse width must be below the detection capability of display devices, such as projectors or monitors. The lower range is limited by the bandwidth of the transmission system. The preferred range for the narrow vertical sync component VN pulse width is from about 20 nanoseconds to about 60 nanoseconds. The optimal pulse width for narrow vertical sync component VN is about 20 nanoseconds.

Viewing a gain FIG. 1, numeral 50 indicates a second sync converting means. Horizontal sync component H is passed through second sync converting means 50 and becomes converted into a narrow horizontal sync component. Viewing now FIG. 3, letters HN indicate the narrow horizontal sync component. Numeral 150 indicates the graph of narrow horizontal sync component HN, which is shown in FIG. 3 as having the pulse width of 20 nanoseconds. Similarly to narrow vertical sync component VN, narrow horizontal sync component HN can have a pulse width ranging from about 1 nanosecond to about 250 nanoseconds. The upper range of the pulse width must be below the detection capability of display devices, such as projectors or monitors. The lower range is limited by the bandwidth of the transmission system. The preferred range for the narrow horizontal sync component HN pulse width is from about 20 nanoseconds to about 60 nanoseconds. The optimal pulse width for narrow horizontal sync component HN is about 20 nanoseconds.

Viewing again FIG. 1, numeral 20 indicates a first combining means. Red color component R and narrow vertical sync component VN are passed through first combining means 20 thereby generating a combined red color narrow vertical sync component indicated by letters RVN. Numeral 60 indicates a second combining means. Green color component G and narrow horizontal sync component HN are passed through second combining means 60 thereby generating a combined green color narrow horizontal sync component indicated by letters GHN. Letters DT indicate a differential transmitter. Letters DR indicate a differential receiver.

Figure 4:
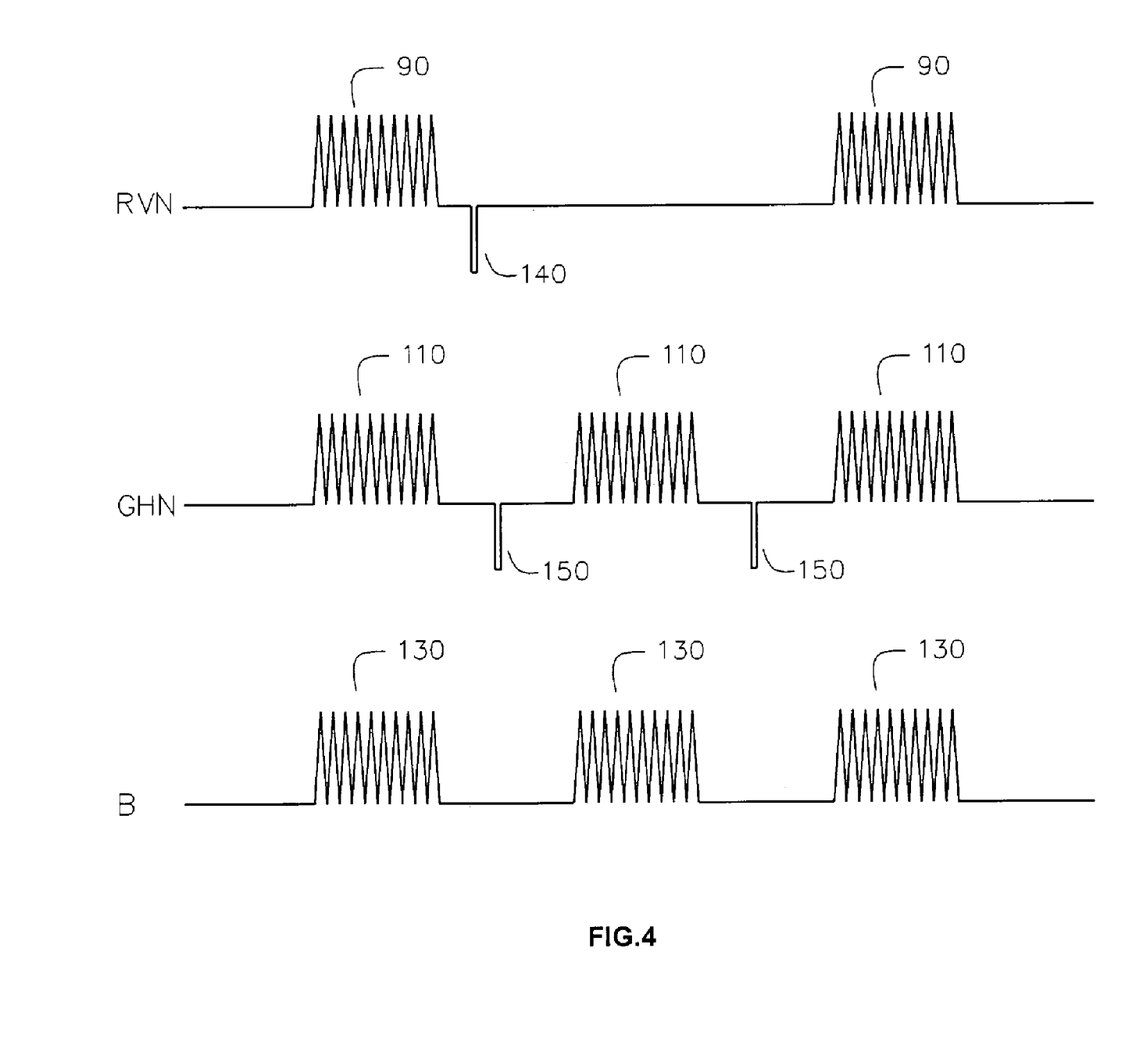
FIG. 4 shows graphs of the components of the computer video signal at juncture 3 of FIG. 1.

Viewing now FIG. 4, there are shown the graphs of combined red color narrow vertical sync component RVN and combined green color narrow horizontal sync component GHN at junction 3.

Viewing again FIG. 1, letters TP indicate a twisted pair cable, and more specifically, three pairs of conductors of the twisted pair cable. Combined red color narrow vertical sync component RVN, combined green color narrow horizontal sync component GHN and blue color component B are transmitted via the twisted pair cable TP such that one pair of conductors is used for transmission of each of the components, thereby utilizing only three pairs of conductors.

Still viewing FIG. 1, numeral 30 indicates a first means of sync extracting. A portion of combined red color narrow vertical sync component RVN is passed through first means of sync extracting 30 thereby extracting narrow vertical sync component VN from combined red color narrow vertical sync component RVN. A simple high speed comparator can be used to extract horizontal and vertical sync components.

Numeral 70 indicates a second means of sync extracting. A portion of combined green color narrow horizontal sync component GHN is passed through second means of sync extracting 70 thereby extracting narrow horizontal sync component HN from combined green color narrow horizontal sync component GHN. A simple high speed comparator can be used to extract horizontal and vertical sync components.

Figure 5:
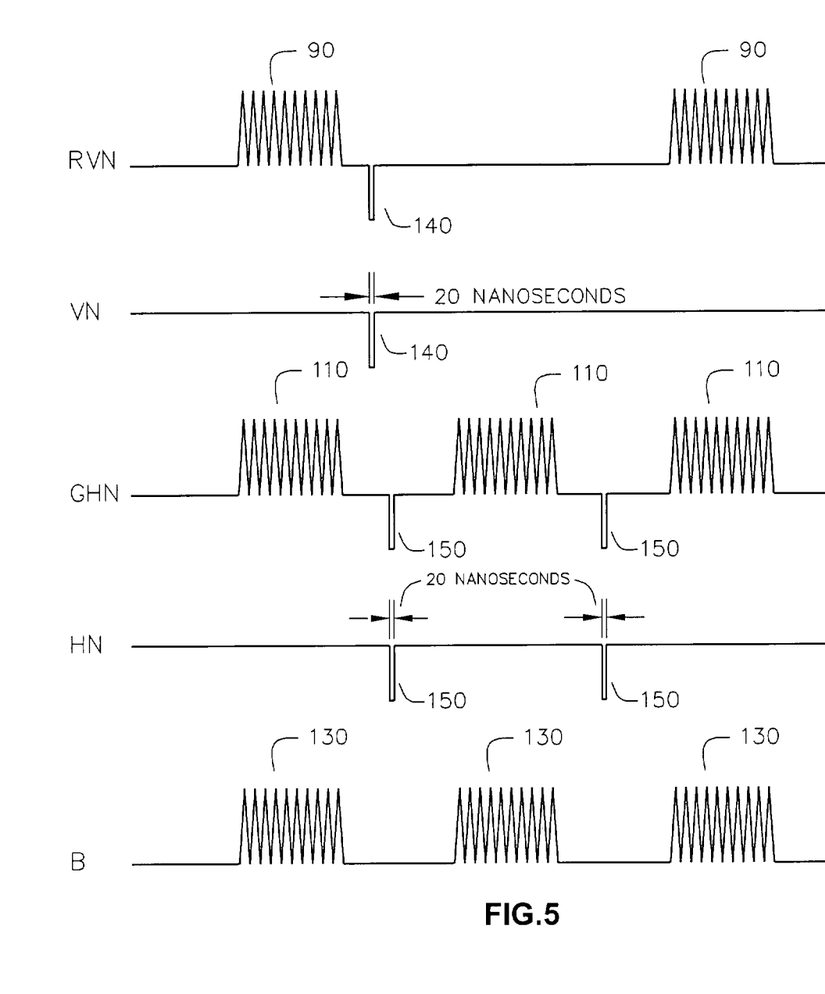
FIG. 5 shows graphs of the components of the computer video signal at juncture 4 of FIG. 1.

Viewing now FIG. 5, there are shown the graphs of combined red color narrow vertical sync component RVN, narrow vertical sync component VN, combined green color narrow horizontal sync component GHN, narrow horizontal sync component HN and blue color component at junction 4.

Viewing again FIG. 1, numeral 40 indicates a third sync converting means. Narrow vertical sync component VN is passed through third sync converting means 40, thereby converting narrow vertical sync component VN into vertical sync component V. This can be easily done by utilizing a one shot circuit.

Numeral 80 indicates a fourth sync converting means. Narrow horizontal sync component HN is passed through fourth sync converting means 80, thereby converting narrow horizontal sync component HN into horizontal sync component H. This can be easily done by utilizing a one shot circuit.

Figure 6:
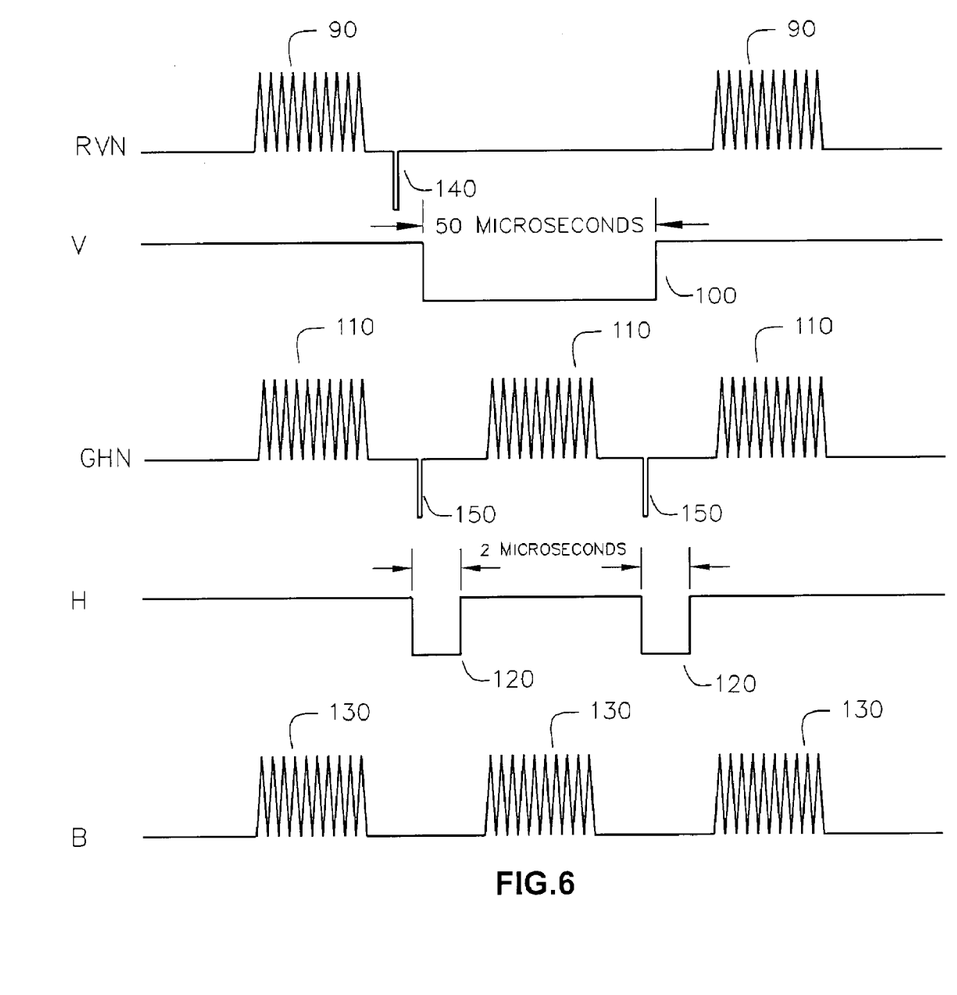
FIG. 6 shows graphs of the components of the computer video signal at juncture 5 of FIG. 1.

Viewing now FIG. 6, there are shown the graphs of combined red color narrow vertical sync component RVN, vertical sync component V, combined green color narrow horizontal sync component GHN, horizontal sync component H and blue color component at junction 5. These components of the computer video signal at junction 5 are received at the display device. Even though the red and green components also comprise narrow sync signals (i.e. RVN and GHN), the narrow sync signals will not be detected by the detection circuits and presence of such narrow sync components in the red and green components will not interfere with the quality of the picture displayed on the display device.

Figure 7:
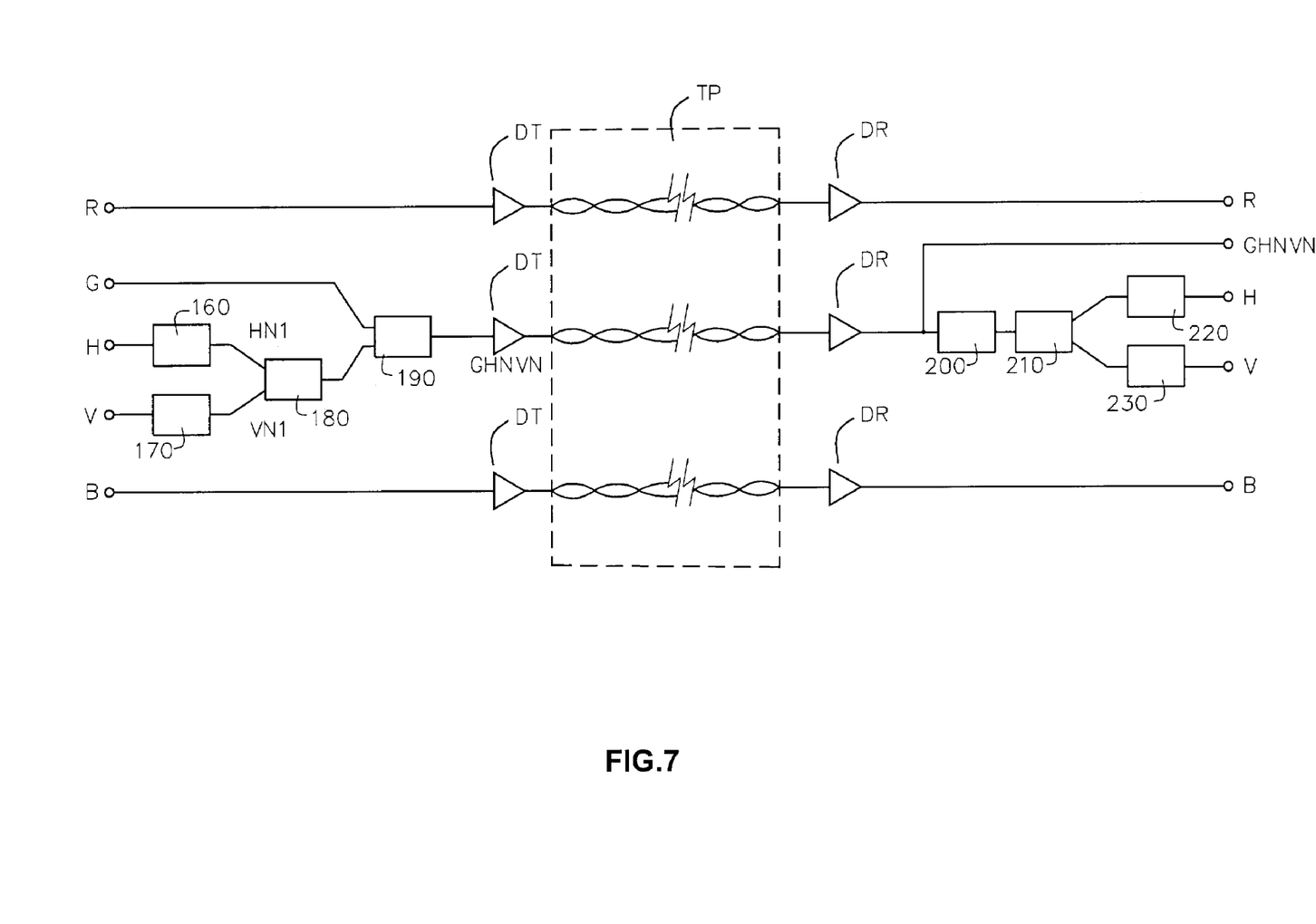
FIG. 7 shows a schematic representation of the method of encoding and decoding computer video signals for transmission over a twisted pair cable according to the alternative embodiment of the present invention.

Viewing now FIG. 7, Numeral 160 indicates a fifth sync converting means. Horizontal sync component H is passed through fifth sync converting means 160 and becomes converted into a narrow horizontal sync component. Letters HN1 indicate the narrow horizontal sync component. Narrow horizontal sync component HN1 can have a pulse width ranging from about 1 nanosecond to about 250 nanoseconds. The upper range of the pulse width must be below the detection capability of display devices, such as projectors or monitors. The lower range is limited by the bandwidth of the transmission system. The preferred range for the narrow horizontal sync component HN1 pulse width is from about 20 nanoseconds to about 60 nanoseconds. The optimal pulse width for narrow horizontal sync component HN1 is about 20 nanoseconds.

Numeral 170 indicates a sixth sync converting means. Vertical sync component V is passed through sixth sync converting means 170 and becomes converted into a narrow vertical sync component. Letters VN1 indicate the narrow vertical sync component, narrow vertical sync component VN1 can have a pulse width ranging from about 1 nanosecond to about 250 nanoseconds. The upper range of the pulse width must be below the detection capability of display devices, such as projectors or monitors. The lower range is limited by the bandwidth of the transmission system. The preferred range for the narrow vertical sync component VN1 pulse width is from about 20 nanoseconds to about 60 nanoseconds. The optimal pulse width for narrow vertical sync component VN1 is about 60 nanoseconds, however, unlike the previous embodiment of this invention, the pulse width of narrow vertical sync component VN1 must be different from that of narrow horizontal sync component HN1.

Numeral 180 indicates a third combining means. Narrow horizontal sync component HN1 and narrow vertical sync component VN1 are passed through third combining means 180 thereby generating a combined narrow horizontal sync narrow vertical sync component.

Numeral 190 indicates a fourth combining means. The green and combined narrow horizontal sync narrow vertical sync components are passed through fourth combining means 190 thereby generating a combined green narrow horizontal sync narrow vertical sync component indicated by letters GHNVN.

Red component R, combined green narrow horizontal sync narrow vertical sync GHNVN and blue component B are then transmitted via a twisted pair cable TP such that one pair of conductors is used for transmission of each of the components, thereby utilizing only three pairs of conductors.

Numeral 200 indicates a third means of sync extracting. A portion of combined green narrow horizontal sync narrow vertical sync GHNVN is passed through third means of sync extracting 200 thereby extracting the combined narrow horizontal sync narrow vertical sync component from the combined green narrow horizontal sync narrow vertical sync component.

Numeral 210 indicates a sync separation means. The combined narrow horizontal sync narrow vertical sync component is passed through sync separation means 210, thereby separating the narrow horizontal sync component from the narrow vertical sync component.

Numeral 220 indicates a seventh sync converting means. The narrow horizontal sync component is passed through seventh sync converting means 220, thereby converting the narrow horizontal sync component into the horizontal sync component.

Numeral 230 indicates an eighth sync converting means. The narrow vertical sync component is passed through eighth sync converting means 230, thereby converting the narrow vertical sync component into the vertical sync component.

The computer video signal comprising the red (R), combined green narrow horizontal sync narrow vertical sync (GHNVN), horizontal sync (H), vertical sync (V) and blue (B) components are then received at the display device. Even though green component G also comprises narrow horizontal sync (HN) and narrow vertical sync (VN) components (i.e. GHNVN), the narrow sync signals will not be detected by the detection circuits and presence of such narrow sync components in green component will not interfere with the quality of the picture displayed on the display device.

The preferred embodiment of this invention described above uses red as a first color component, green as a second color component and blue as a third color component. However, any combination of color components can be used, specifically, the red, green and blue color components are interchangeable in the above description.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A method of encoding and decoding computer video signals for transmission over a twisted pair cable, comprising the steps of:
    (a) providing a computer video signal comprising red, green, blue, vertical sync and horizontal sync components;
    (b) converting the vertical sync component into a narrow vertical sync component;
    (c) combining the narrow vertical sync component with the red component, thereby generating a combined red narrow vertical sync component;
    (d) converting the horizontal sync component into a narrow horizontal sync component;
    (e) combining the narrow horizontal sync component with the green component, thereby generating a combined green narrow horizontal sync component;
    (f) transmitting the combined red narrow vertical sync, combined green narrow horizontal sync and blue components via a twisted pair cable such that one pair of conductors is used for transmission of each of the components, thereby utilizing only three pairs of conductors;
    (g) extracting the narrow vertical sync component from the combined red narrow vertical sync component without removing the narrow vertical sync component from the combined red narrow vertical sync component;
    (h) converting the narrow vertical sync component into the vertical sync component;
    (i) extracting the narrow horizontal sync component from the combined green narrow horizontal sync component without removing the narrow horizontal sync component from the combined green narrow horizontal sync component;
    (j) converting the narrow horizontal sync component into the horizontal sync component;

(k) receiving the computer video signal comprising the combined red narrow vertical sync, combined green narrow horizontal sync, blue, vertical sync and horizontal sync components.

2. A method as in claim 1, wherein the narrow vertical sync component and the narrow horizontal sync component having a pulse width ranging from about 1 nanosecond to about 250 nanoseconds.

3. A method as in claim 1, wherein the narrow vertical sync component and the narrow horizontal sync component having a pulse width ranging from about 20 nanoseconds to about 60 nanoseconds.

4. A method as in claim 1, wherein the narrow vertical sync component having a pulse width of about 20 nanoseconds and the narrow horizontal sync having a pulse width of about 20 nanoseconds.

5. A method of encoding and decoding computer video signals for transmission over a twisted pair cable, comprising the steps of:
   (l) providing a computer video signal comprising red, green, blue, vertical sync and horizontal sync components;
   (m) converting the horizontal sync component into a narrow horizontal sync component;
   (n) converting the vertical sync component into a narrow vertical sync component having a pulse width different from that of the narrow horizontal sync component;
   (o) combining the narrow horizontal sync component with the narrow vertical sync component thereby generating a combined narrow horizontal sync narrow vertical sync component; (
   p) combining the combined narrow horizontal sync narrow vertical sync component with the green component thereby generating a combined green narrow horizontal sync narrow vertical sync component;
   (q) transmitting the red, combined green narrow horizontal sync narrow vertical sync and blue components via a twisted pair cable such that one pair of conductors is used for transmission of each of the components, thereby utilizing only three pairs of conductors;
   (r) extracting the combined narrow horizontal sync narrow vertical sync component from the combined green narrow horizontal sync narrow vertical sync component without removing the combined narrow horizontal sync narrow vertical sync component from the combined green narrow horizontal sync narrow vertical sync component;
   (s) separating the narrow horizontal sync component from the narrow vertical sync component;
   (t) converting the narrow horizontal sync component into the horizontal sync component;
   (u) converting the narrow vertical sync component into the vertical sync component;
   (v) receiving the computer video signal comprising the red, combined green narrow horizontal sync narrow vertical sync, horizontal sync, vertical sync and blue components.

6. A method as in claim 5, wherein the narrow vertical sync component and the narrow horizontal sync component having a pulse width ranging from about 1 nanosecond to about 250 nanoseconds.

7. A method as in claim 5, wherein the narrow vertical sync component and the narrow horizontal sync component having a pulse width ranging from about 20 nanoseconds to about 60 nanoseconds.

8. A method as in claim 5, wherein the narrow vertical sync component having a pulse width of about 60 nanoseconds and the narrow horizontal sync having a pulse width of about 20 nanoseconds.

* * * * *